(12) United States Patent
Takahashi

(10) Patent No.: US 6,703,619 B2
(45) Date of Patent: Mar. 9, 2004

(54) MULTI-GRID TYPE MICROSTRIP GAS CHAMBER

(76) Inventor: Hiroyuki Takahashi, 1-13-5-706, Mukogaoka, Bunkyo-ku, Tokyo, 113-0023 (JP)

( * ) Notice: Subject to any disclaimer, the term of this patent is extended or adjusted under 35 U.S.C. 154(b) by 0 days.

(21) Appl. No.: 09/773,666

(22) Filed: Feb. 2, 2001

(65) Prior Publication Data

US 2001/0032935 A1 Oct. 25, 2001

Related U.S. Application Data

(60) Provisional application No. 60/179,742, filed on Feb. 2, 2000.

(51) Int. Cl.[7] .............................................. G01T 1/185
(52) U.S. Cl. ................................. 250/385.1; 250/374
(58) Field of Search ........................... 250/385.1, 374

(56) References Cited

U.S. PATENT DOCUMENTS

| | | | |
|---|---|---|---|
| 4,763,008 A | * | 8/1988 | Steele ..................... 250/385.1 |
| 5,500,534 A | | 3/1996 | Robinson et al. ......... 250/385.1 |
| 5,614,722 A | | 3/1997 | Solberg et al. ............. 250/374 |
| 5,675,470 A | | 10/1997 | Gong ......................... 361/220 |
| 6,097,032 A | | 8/2000 | Tanimori et al. ........... 250/374 |
| 6,207,958 B1 | * | 3/2001 | Giakos .................... 250/385.1 |

* cited by examiner

Primary Examiner—Constantine Hannaher
Assistant Examiner—Shun Lee
(74) Attorney, Agent, or Firm—Finnegan, Henderson, Farabow, Garrett & Dunner, LLP

(57) ABSTRACT

A microstrip gas chamber (MSGC) comprises a gas volume, an electrically insulating substrate having a surface exposed to the gas volume. A set of alternating cathode strips and anode strips are provided on the surface of substrate, a high voltage source for establishing a potential difference between the anode and cathode strips is provide to produce an electric field sufficient for avalanche multiplication in said gas medium in a region near the anode strips. Grid electrodes are provided on the surface at each gap between the cathode strip and anode strip. The multi-grid type MSGC can offer very narrow gap between neighboring electrodes that might reduce a surface charge effect considerably. The multi-grid type MSGC may be applied to the field where both high gain and the stable operation are required.

19 Claims, 13 Drawing Sheets pitch 200~1000 μm
cathode width 100~400 μm
anode width 5~10 μm
area 40mm x 40mm

X-ray 8keV, 5.9keV

MSGC(PRIOR ART)

EXPOSED AREAS

M-MSGC

GRIDS

SMALL GAP MSGC

ANODE    CATHODE
500V    0V

M-MSGC

ANODE   GRID   ←→   CATHODE
800V   300V   10μm   0V

FIG.9

- Quartz glass substrate
- 0.2 μm thick Chromium line
- No semiconductor material
- Narrow gaps between electrodes (5~10μm)
- Anode pitch: 200~400 μm
- 3-4 grids between the anode and the cathode
- One through connection for each grid
- Ar 70% + $CH_4$ 30% gas mixture (1 atm)

MULTI-GRID TYPE MICROSTRIP GAS CHAMBER

RELATED APPLICATION

This application claims the benefit of U.S. provisional application Ser. No. 60/179,742, filed Feb. 2, 2000, the benefit of which is hereby claimed under 35 U.S.C. § 119.

FIELD OF THE INVENTION

This invention relates to microstrip gas chambers used to detect the presence of radiation such as x-rays and charged atomic particles.

BACKGROUND OF THE INVENTION

A microstrip gas chamber (MSGC) was first proposed by A. Oed. The principle of MSGC is similar to that of multiwire proportional chambers. Referring to FIG. 1, the MSGC includes a glass substrate, a sequence of alternating cathode strips and anode strips printed by photolithographic techniques on a surface of the substrate. The MSGC is enclosed in a gas volume and voltages are applied to the electrodes (anode strips and cathode strips) to produce an electric field across the gas volume. A charged particle moving through the gas volume causes ionization along its path, creating ion pairs. The electric field across the gas volume causes the electrons to drift toward the anode strips and positive ions toward the cathode strips, so developing an electrical signal. The electric field near the anode strips is sufficiently high for the electrons drifting towards it to accelerate to a point where they themselves are capable of causing further ionization, causing an avalanche of electrons, which amplify the original signal. The increase in the number of electrons detected at the anode strips for each secondary electron entering the avalanche region is known as the gas gain (the multiplication of the signal).

For further description related to the principle of MSGC, see U.S. Pat. No. 5,675,470 issued to Wen G. Gong, U.S. Pat. No. 5,614,722 issued to Keith Solberg, et al., and U.S. Pat. No. 5,500,534 issued to Douglas S. Robinson, et al. which are incorporated herein by reference.

This type of gas chamber has many attractive properties such as excellent mechanical stability, small anode-cathode distance, fast ion collection time, etc.

However, a charge-up problem on the insulating substrate has been observed in MSGC as shown in FIG. 2(A) and it has spoiled better intrinsic properties of MSGC. The accumulation of positive ions on the surface of the substrate between anode and cathode is known to be responsible for gain instability in the MSGC. The positive ions produced due to avalanche amplification occurring in the vicinity of the anode electrodes stick to the surface of the substrate and cause a space-charge effect, modifying the electric field, and resulting in gain instability and a decreased gain.

The surface charge in the MSGC can be removed by providing the slight conductivity to the substrate. This slight conductivity should he chosen to be quite high in order to minimize the electric field distortion in the MSGC and keep a high gas amplification of the MSGC. However, this conductivity might still affect the increasing probabilities of the streamers which are thought to be originated from the electron emission at the cathode surface. The conductivity enhances the lateral field near the substrate surface between the anode and the cathode that may cause streamer discharge, result in breakage of electrodes. Therefore, the possibilities of streamers limit the maximum amplification factors attained without any possible damage to the electrodes.

Many works have been already attempted to optimize the surface conductance and the electrode shapes or even remove the substrate. One effective method is to use a so-called small gap distance between the anode and the cathode as shown in FIG. 2 (B). Recently, many researchers are interested in the small gap MSGC because this type of detector relieves the surface charge-up problem and provide a better stability in operation.

This approach, however, suffers from the poor gas gain of the MSGC. This structure has a serious drawback in its gas gain in that the gain is usually restricted within several hundreds to one thousand. If a higher voltage is applied to a gap between each anode strip and the corresponding cathode strip, discharge is likely to occur between the anode strip and the cathode strip, resulting in breakage of the electrodes. To improve the obtainable gas gain, some groups used an additional insulator to isolate neighboring electrodes to prevent discharge between the anode and cathode.

The present invention seeks to eliminate those drawbacks of the conventional MSGC.

An object of the present invention is to eliminate the charge build-up on the surface of a substrate between anode and cathode strips.

Another object of the present invention is to prevent the occurrence of discharge between the anode strip and the cathode strips.

Still another object of the present invention is to provide a MSGC having the high gain and the stable operation.

SUMMARY OF THE INVENTION

In accordance with the present invention, there is provided a microstrip gas chamber comprises a gas volume, an electrically insulating substrate having a surface exposed to the gas volume, a set of alternating cathode strips and anode strips on the surface of substrate, a high voltage source for establishing a potential difference between the anode and cathode strips to thereby produce an electric field sufficient for avalanche multiplication, in the gas medium in a region near the anode strips, and at least one grid electrode provided on the surface at each gap between the cathode strip and anode strip.

In accordance with the present invention, an exposed area between the anode and cathode strips is decreased or minimized by providing the grid at the gap between the anode strip and cathode strips so that the accumulation of positive ions on the exposed surface is eliminated.

Preferably, the grid is a strip extending along the lengths of anode and cathode strips. Preferably, a plurality of grid strips are provided at the gap between the anode strip and cathode strip. The grid may be comprised of a plurality of grid elements (a short strip, for example) which are spacedly arranged to each other along the lengths of anode strip and cathode strip.

In accordance with the present invention, the grid eliminates or shields the lateral electric field near the surface of the substrate between the neighboring anode and cathode strips. Though the grid may somehow work without positively applying any potential to the grid, most preferably, a predetermined voltage is applied to the grid. The predetermined voltage may be different than those applied to the anode and cathode strips. More specifically, the predetermined voltage is higher than that applied to the cathode strips, and is lower than that applied to the anode strips. In case of providing multiple strip grids at the gap between the anode strip and cathode strip, individual voltages may be applied to the grids and respective high voltage sources may be provided.

To shield the lateral electric field between the neighboring anode and cathode strips near the surface effectively, a height of grid electrode may be higher than those of anode and cathode strips though the fabrication may be more complicated. In case of providing one grid between the gap for example, the grid electrode may be provided near the anode strip and a relatively wider exposed surface area is presented between the grid electrode and the cathode strip since the gas gain is mostly determined by the electric field near the anode strip and surface charges between the anode strip and the grid nearest to the anode strip.

BRIEF DESCRIPTION OF THE DRAWINGS

The above and other objects and features of the present invention will become more apparent from the following detailed descriptions of preferred embodiments when read in conjunction with the accompanying drawings, wherein:

FIG. 9 shows particulars of the test detectors;

DETAILED DESCRIPTION OF THE PREFERRED EMBODIMENT

The principle of a multi-grid type MSGC

To reduce the surface conductivity or to use the insulator substrate, modifying the layout of the surface electrodes has been considered. Conventional microstrip plates (MS plate) do not have other electrodes than anodes or cathodes. By inserting additional electrodes between the anode and cathode, much flexibility in controlling the electric field around the surface can be obtained. This is the original starting point of the present multi-grid type MSGC (M-MSGC).

Figure 1:
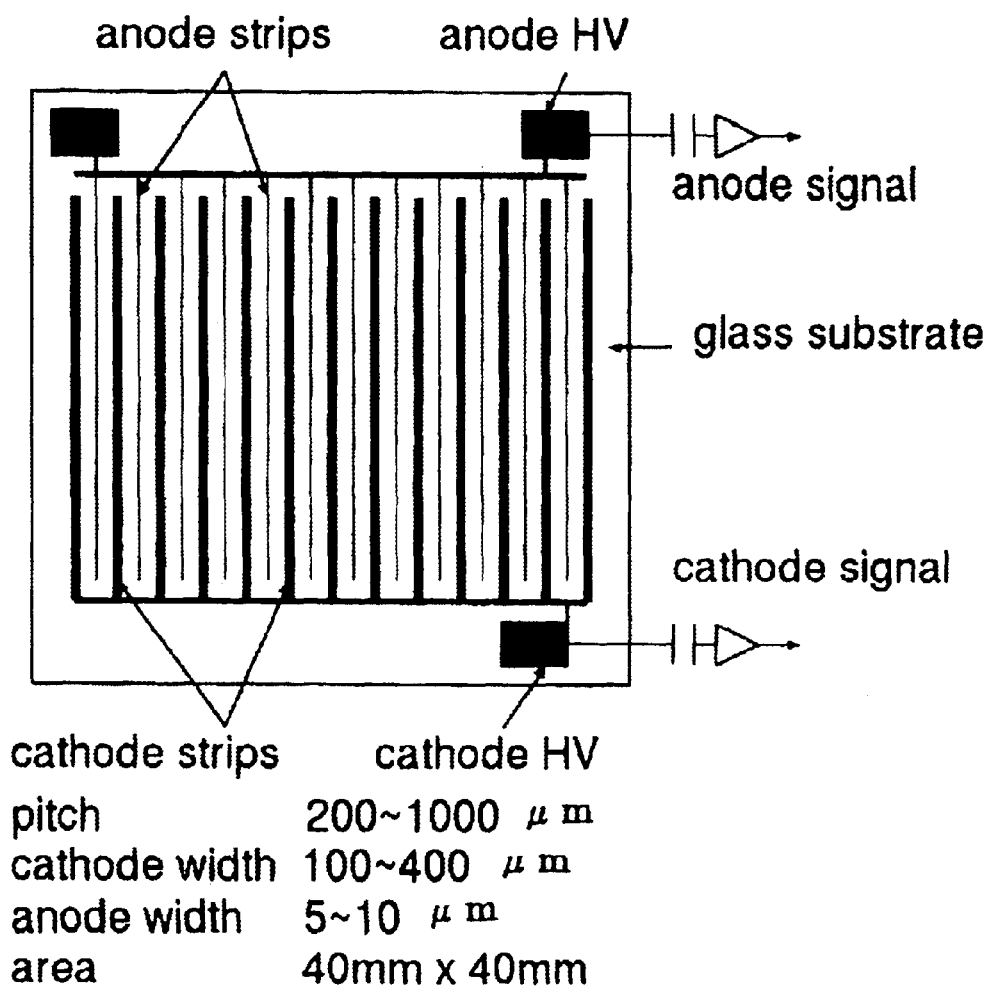
FIG. 1 shows a plan view of a conventional MSGC.
Figure 2A:
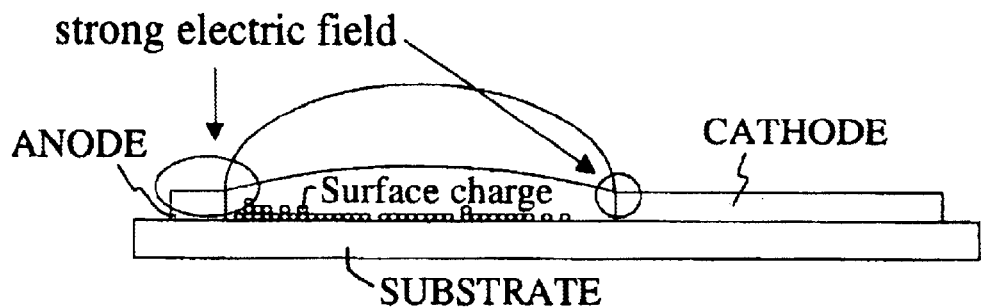
FIG. 2(A) is a partial cross-sectional illustration of the conventional MSGC.
Figure 2B:
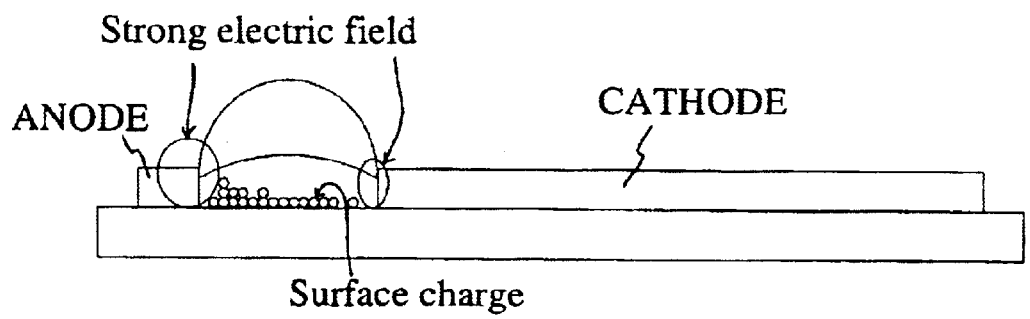
FIG. 2(B) is a partial cross-sectional illustration of a conventional small gap MSGC.
Figure 3A:
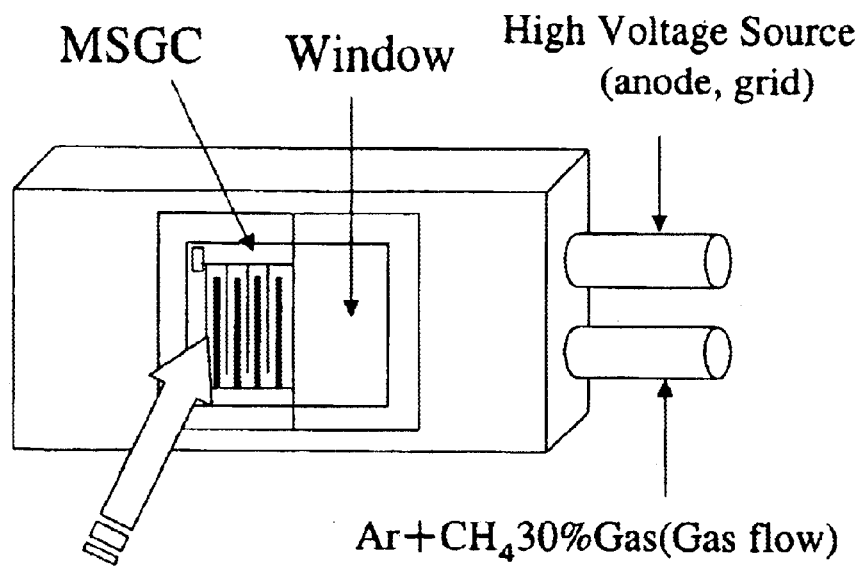
FIG. 3(A) is a schematic illustration of the MSGC.
Figure 3B:
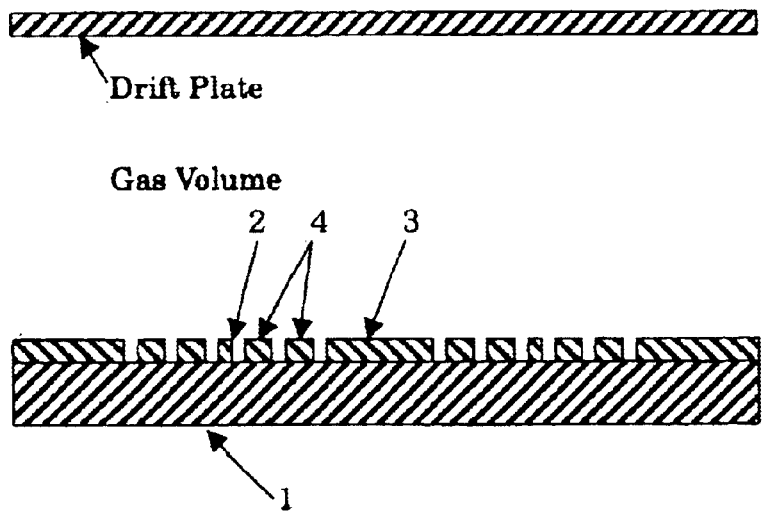
FIG. 3(B) is a cross-sectional illustration of the MSGC according to the present invention.

Referring now to FIG. 3(A), the MSGC includes a chamber for providing a gas volume or gaseous medium therein, a microstrip plate housed inside the chamber and enclosed in the gas volume, a window provided in the wall of the chamber for receiving particles to be detected. The chamber includes an inlet and an outlet for the gas flow though one of which is not shown in FIG. 3(A). Referring to FIG. 3(B), the MS plate comprises a substrate 1 made of an electrically insulating material, a set of alternating anode strips 2 and cathode strips 3 on the surface of the substrate 1 and a plurality of grids 4 provided on the surface at a gap between the anode strip 2 and cathode strips 3.

The substrate is made of an electrically insulating material such as quartz glass. One preferable example, the substrate is a simple one-layer structure made of quartz glass. The substrate may be made of other glass materials, semiconducting glass materials, silicon, silicon oxide, plastics such as polyimide resin, ion-implanted materials, and any other materials adapted for use with a microstrip gas chamber.

Figure 8:
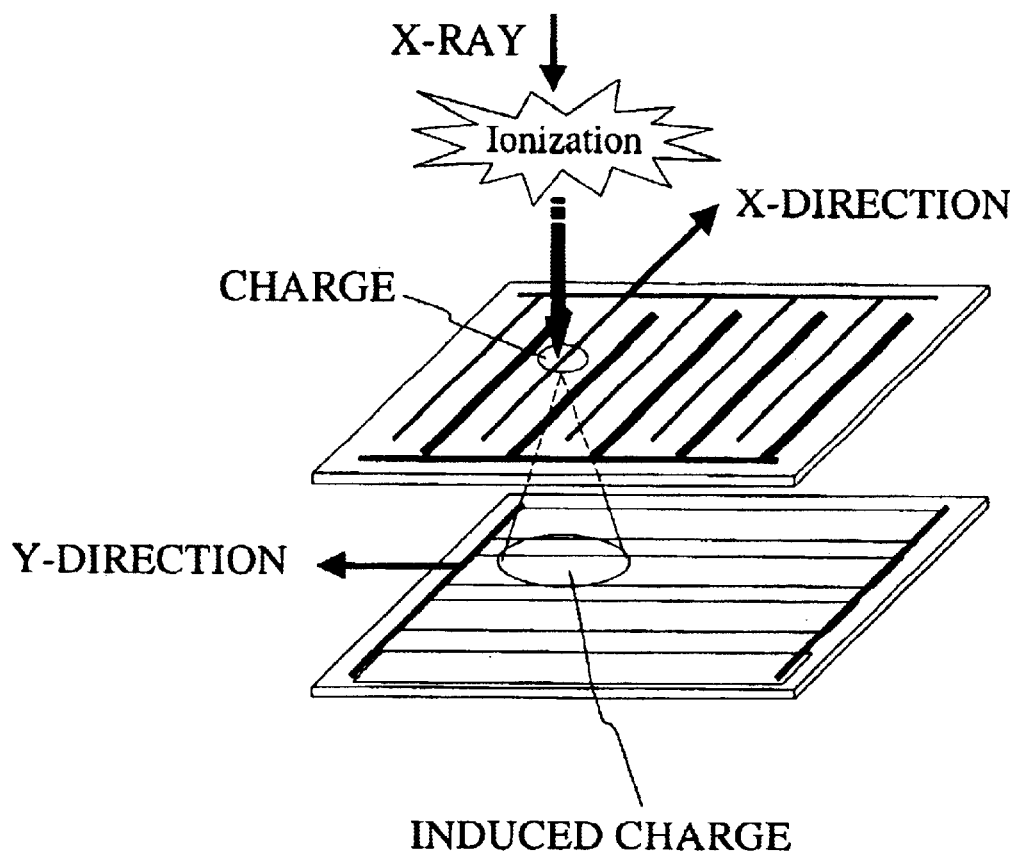
FIG. 8 is an exploded illustration showing the two-dimensional MSGC.

For the one-dimensional microstrip gas chamber, a thickness of the substrate is not limited. For the two-dimensional microstrip gas chamber comprising a substrate having a top surface and an opposite bottom surface, a set of alternating anodes and cathodes provided on the top surface, and a plurality of back strips provided on the bottom surface to detect charges induced on the bottom surface as shown in FIG. 8, the thickness of the substrate is preferably between 0.1 mm to 2.5 mm. The two-dimensional microstrip gas chamber is known and disclosed in U.S. Pat. No. 6,097,032 issued to Tanimori, et al, which is incorporated herein by reference. Though the area of the substrate is varied depending on the substrate materials or particles to be detected, the size of the substrate can be extended to about 40 cm$^2$.

Preferably, the electrodes including anode strips, cathode strips, back strips and grids are metallic strips made of metal such as Cr, Au, Al, W, and Cu. The anodes are typically 5 $\mu$m to 15 $\mu$m wide. The cathodes are wider than the anodes, and are typically about 90 $\mu$m wide. The pitch of the microstrip pattern is several hundred microns.

Figure 5A:
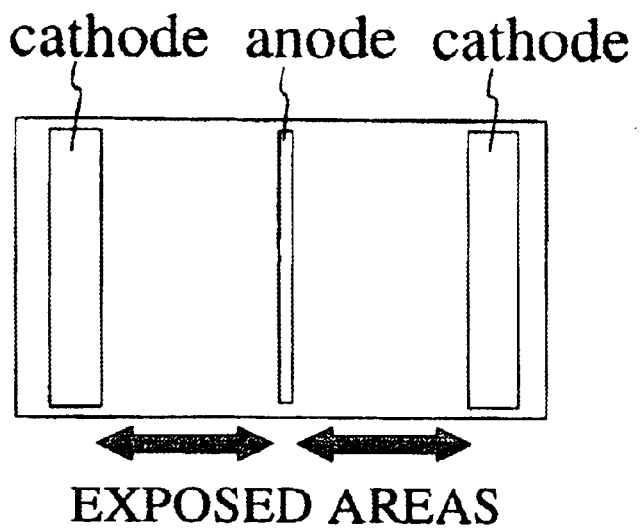
FIG. 5(A) is a partial plan view of a conventional MS plate (the half of cathode is shown)
Figure 5B:
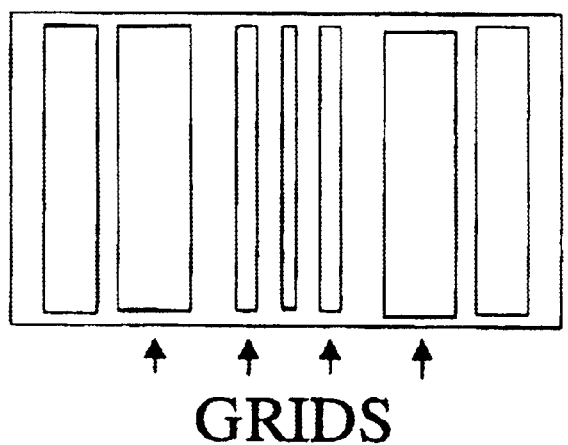
FIG. 5(B) is a partial plan view of a MS plate according to the present invention (the half of cathode is shown)

The width of the grid is typically larger than the anode width and smaller than the cathode width. In case that a plurality of grids are provided at the gap between the neighboring anode and the cathode strips, the width of each grid may increase one after another from one grid nearest to the anode strip to another grid nearest to the cathode strip. As shown in FIG. 5(B), an exposed area between neighboring anode strip and the cathode strip is eliminated by providing grid electrodes on the area. The number of grids provided at each gap between the anode strip and the corresponding cathode strip is not limited and even one strip grid at the gap serves to preclude drawbacks of the conventional MSGC. Effectively, multiple grids may be provided on the gap to minimize the exposed are and to relieve the electric field between the anode and cathode. The number of grids may depend on the fabrication techniques. If the anode-cathode pitch is 400 $\mu$m, four grids may be provided between the gap. If the anode-cathode pitch is 200 $\mu$m, three grids may be provided.

Figure 4:
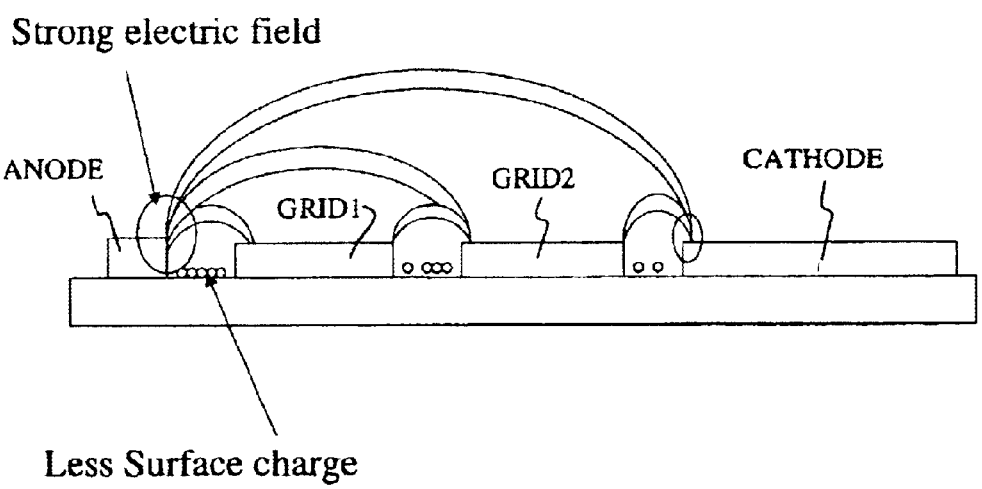
FIG. 4 is a partial cross-sectional illustration showing the structure of the multi-grid type MSGC according to the present invention.

The MSGC includes a high voltage source for introducing potential between the anode and the corresponding cathode strips to establish an electric field in the gas volume. Preferably, a cathode plate or drift plate is provided in the chamber as shown In FIG. 3 (B). The drift plate defining a drift plane is well known. According to the chamber shown in FIG. 3 (A), the window is made of Beryllium that is an electrically insulating material so that the electric field can be obtained by the anode strips and cathode strips without positively providing the drift plate. Predetermined voltages (typically higher than the cathode voltage, and lower than the anode voltage) are applied to the plurality of grids 4 to apply an independent potential to each of them as shown in FIG. 4. In this regard, a plurality of independent high voltage sources may be provided. In addition, referring to FIG. 4, electric field lines that start from an edge of the anode strip toward the cathode strip terminate at the cathode strip in the vicinity of an edge not the edge of the cathode strip because of the electric field between the grid 2 and the cathode strip.

Figure 6A:
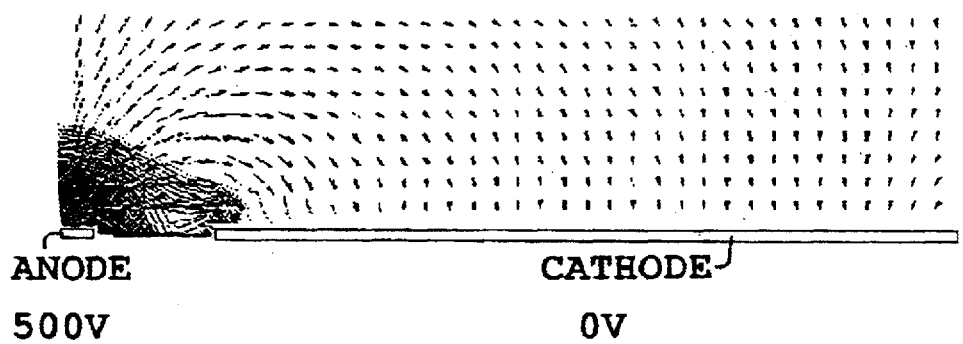
FIG. 6 (A) shows an example of an electric field for a small gap MSGC (Anode=500V, Cathode=0V), in which the anode width is 5 $\mu$m, the cathode width is 60 $\mu$m where the half of the anode strip is shown, and the anode-cathode gap length is 10 $\mu$m.
FIG. 6(B) shows an electric filed of a M-MSGC (Anode=800V, Grid=300V, Cathode=0V), in which the anode width, the grid width and the cathode width are 5 $\mu$m, 20 $\mu$m and 30 $\mu$m, respectively, the distance between the electrodes is set to be 10 $\mu$m, and the half of the anode strip is shown.
Figure 6B:
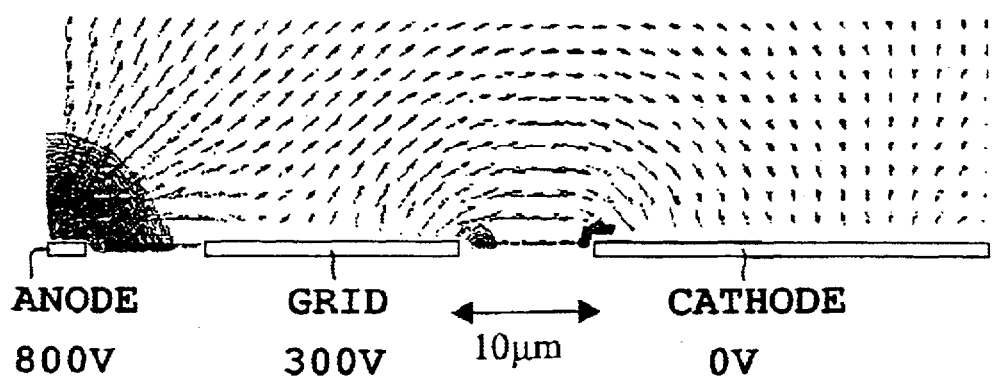
Figure 7:
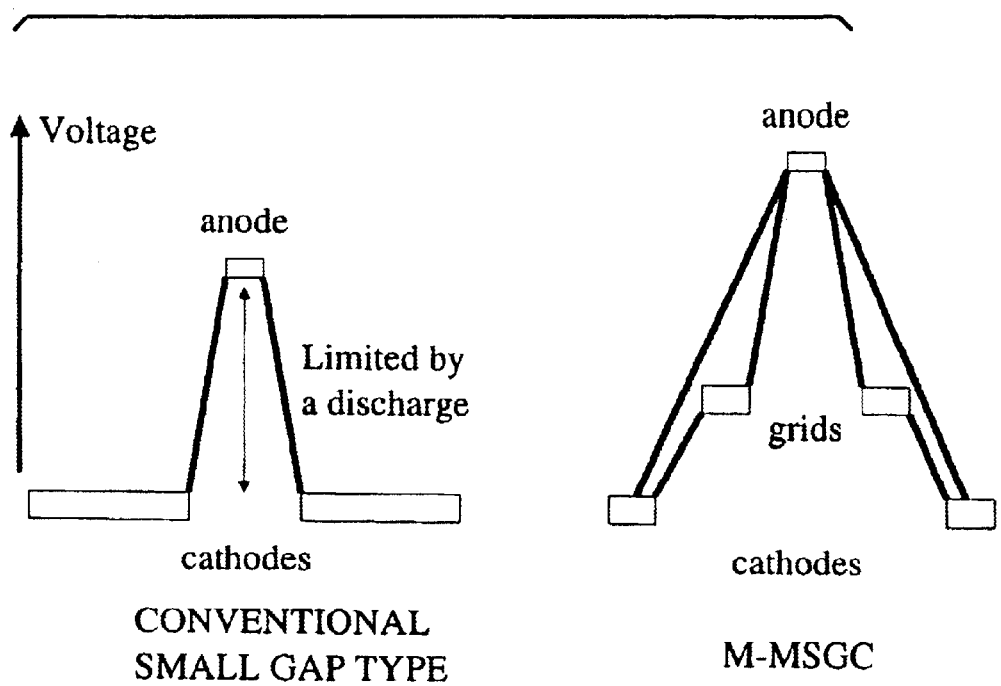
FIG. 7 shows a comparison of obtainable gain between the conventional small gap MSGC and the M-MSGC.

Referring to FIG. 6 (A) showing an example of an electric field for a small gap MSGC, a considerably high electric field around the cathode edge is observed. On the contrary, FIG. 6 (B) shows an electric field of a primitive M-MSGC structure with only one grid placed between the anode and the cathode where the same anode-grid voltage difference is applied (Anode=800V, Grid=300V, Cathode=0V). This figure shows the smaller electric field near the edge of the grid compared with the cathode edge in the small gap MSGC. Since a destructive discharge often observed in the MSGC is thought to be started from the cathode by an ion impact or a field emission, the relieved electric field in the M-MSGC structure near the first grid is preferable for avoiding such a spark damage. This characteristic relieves the discharge between the anode and the first grid and higher applied voltage can be expected. In this way, as shown in FIG. 7, we can expect a higher gain over the conventional small gap MSGC.

Fabrication of a test detector and the measurement of its characteristics

Figure 10:
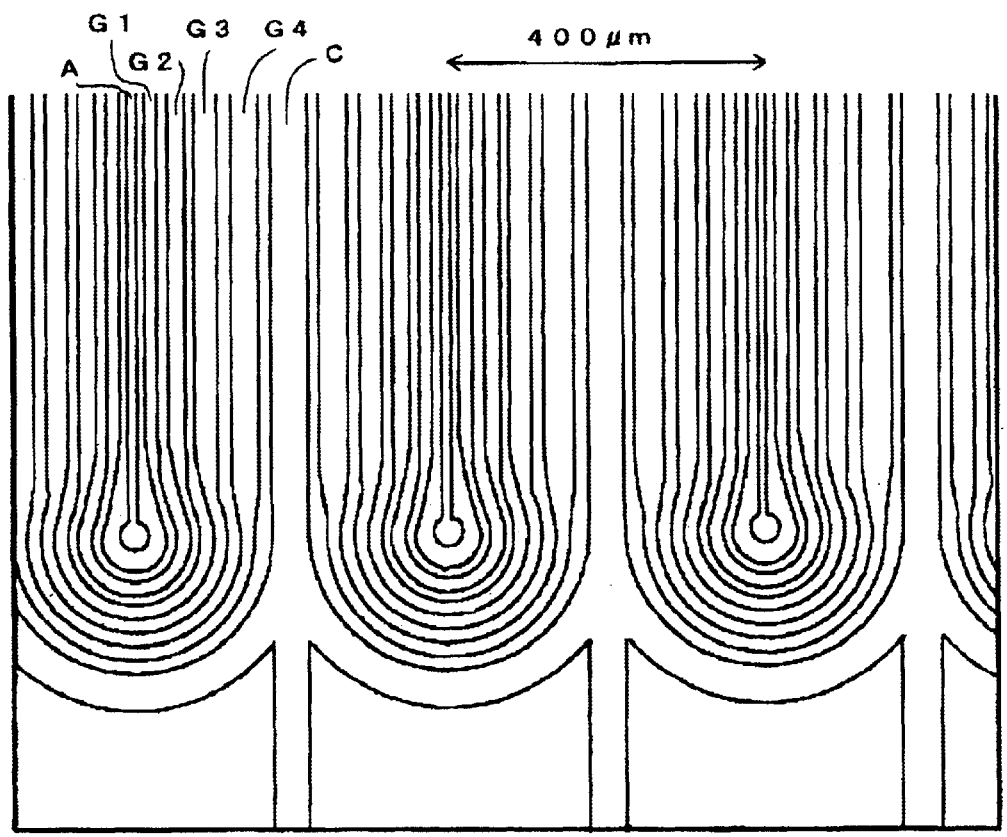
FIG. 10 is a partial plan view of MS plate.

Pattering of the single surface is not so much of a complicated procedure. This is just the CAD work. A special M-MS plate that has four grids placed between the anode and the cathode has been designed. Then several kinds of M-MSGC were fabricated. In this stage, any semiconducting material between electrodes on the front surface was not used. Particulars of test detectors are shown in FIG. 9. The photograph of a test detector pattern is shown in FIG. 10. Referring to FIG. 10, the anode A width is 5 $\mu$m and all gap widths between neighboring electrodes are set to be 10 $\mu$m. Four grids placed between the anode A and the cathode C were used. The first (G1), the second (G2), the third (G3), and the fourth (G4) grid widths are 20 $\mu$m, 25 $\mu$m, 35 $\mu$m, and 42.5 $\mu$m, respectively.

Cathode width was set to be 50 $\mu$m, however, due to the simplicity of the power supply, G4 and the cathode were electrically connected together to form a wider cathode (The grid4 was kept at the ground potential.). This detector needs four independent high voltage sources, however, in order to save the number of high voltage supply, the third grid (G3) potential was applied through the resistor divider connected to G2. The cathode was kept at the ground potential. This test detector was operated in Ar 70%+CH$_4$ 30% gas mixture (1 atm) and the characteristics were measured.

Figure 11:
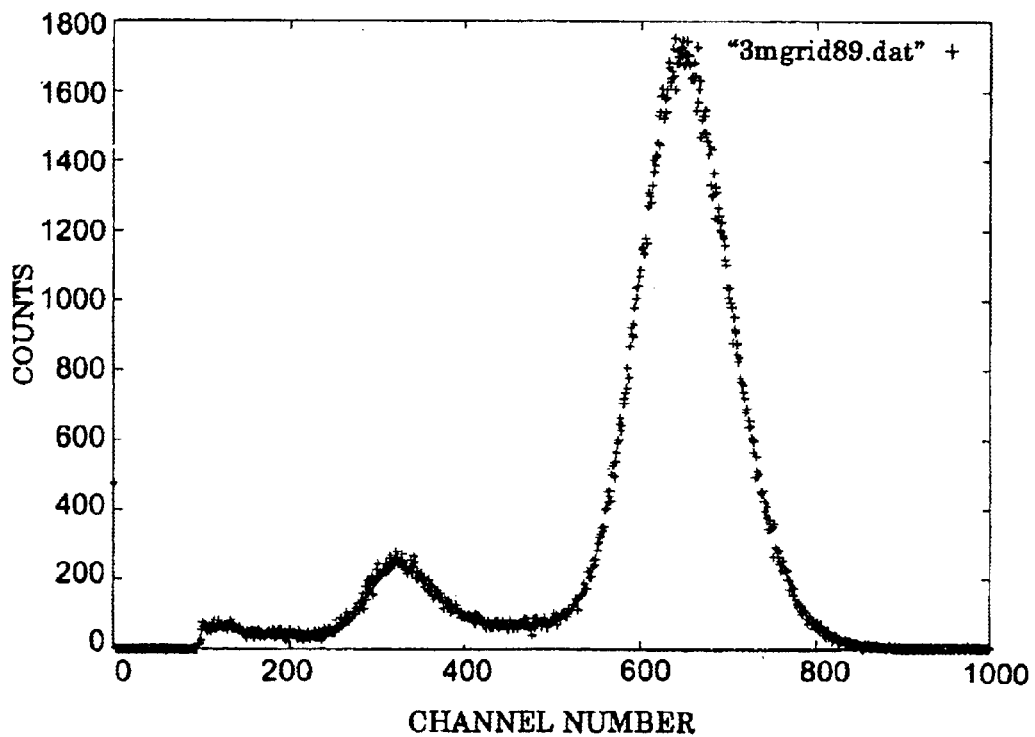
FIG. 11 shows $^{55}$Fe x-ray spectra measured by the M-MSGC.
Figure 12:
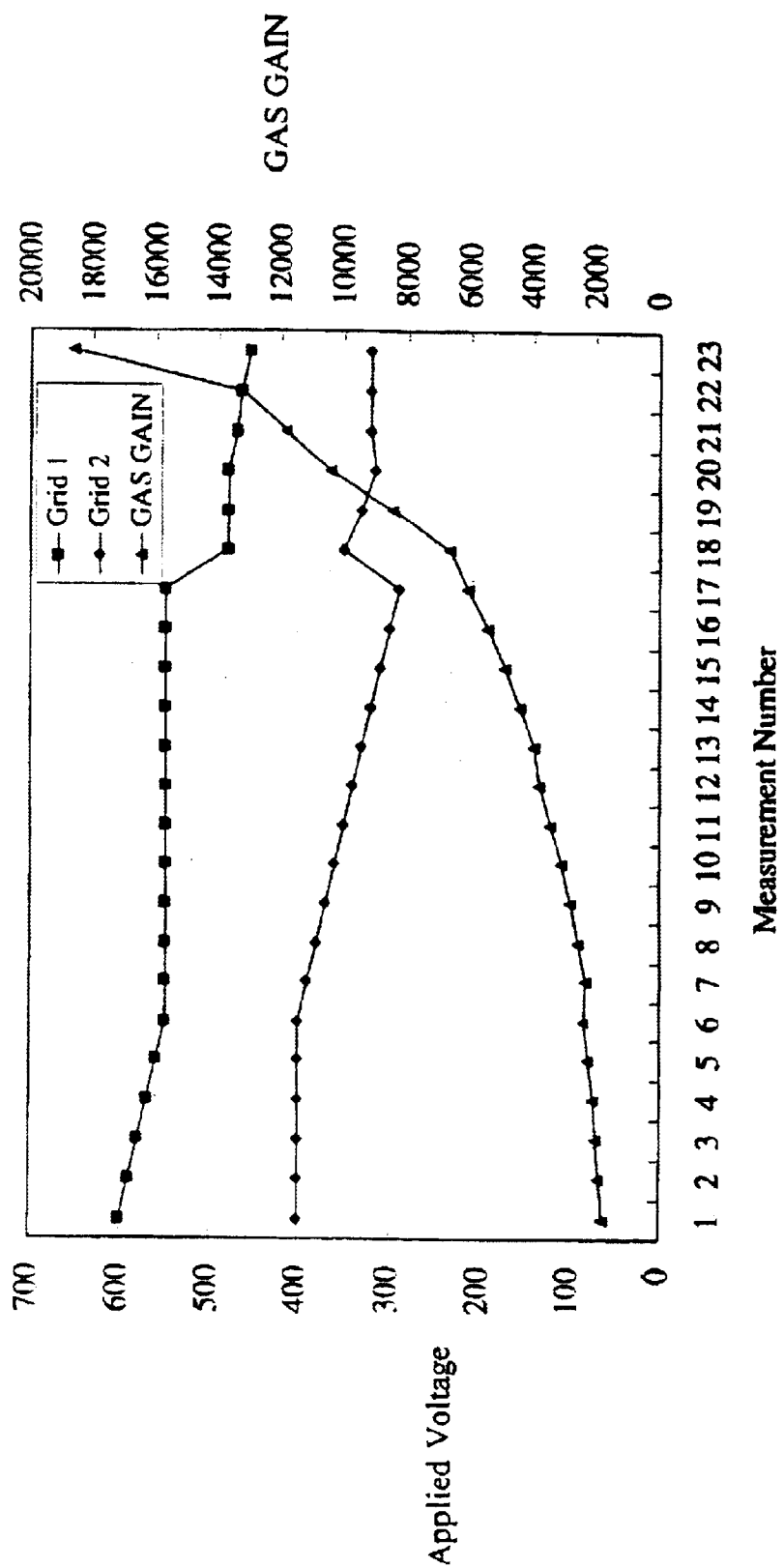
FIG. 12 shows gas gain dependence on the grid voltages.

First the gas gain characteristics were tested. During this experiment, anode and G1 voltages were applied through 500 M $\omega$ resistors to minimize the spark damage around the highest gain. This detector is somewhat flexible and complicated detector because three high voltages are independently adjusted. For example, the same gas gain of the detector might be accomplished by many different sets of applied voltages. Increasing anode voltage can raise the gas gain, but decreasing the grid potentials also increases the gas gain. FIG. 12 shows the gas gain dependency on the grid potentials. The data were taken by setting the anode voltage to 850 V. In this setting, the total gas gain was more sensitive to G2 compared to G1 which was the nearest grid to the anode. By choosing the adequate grid potentials, we can successfully obtained the maximum stable gain at $1.8 \times 10^4$. Typical energy spectrum obtained with a $^{55}$Fe source is shown in FIG. 11. This is obtained by a fully available area exposure and the gas gain was approximately 4000. This is much better than the conventional small gap MSGCs, The photopeak energy resolution was about 18.6% FWHM.

Since the grid electrodes might also collect a signal charge from each pulse signal, we have checked the portion of cathode signals to the anode signals. We have compared the relative cathode signal amplitude to the anode signal. However, the loss of the cathode signal was less than 5% in wide range of the gas gain and the different set of the applied voltages.

Figure 13:
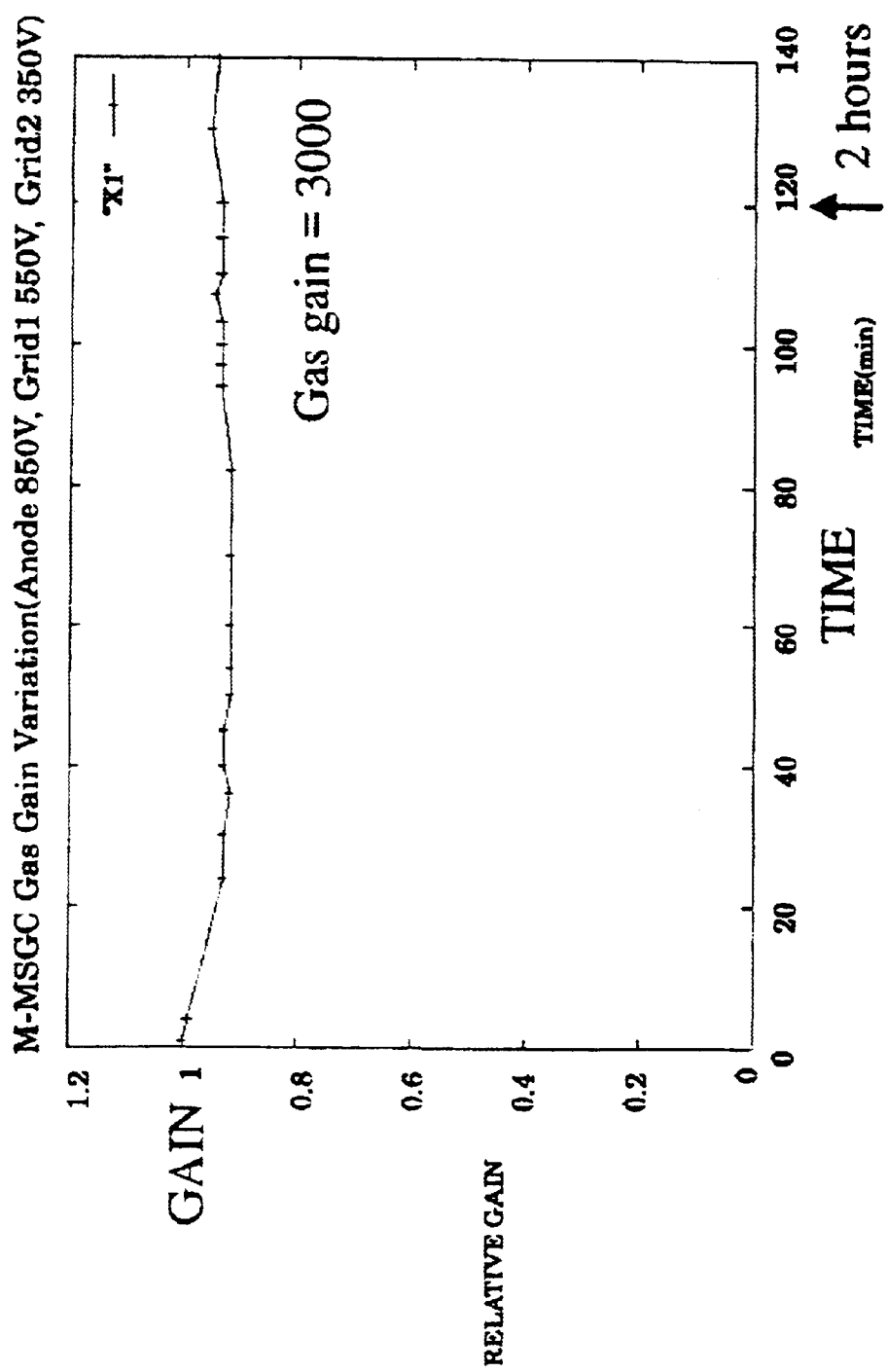
FIG. 13 shows gas gain variation for constant irradiation of X-rays at 2 kcps/mm$^2$.

The short time gas gain stability of the plate was checked. Plates were irradiated by an 8 keV X-ray beam of the 2 kHz/mm$^2$ beam intensity. FIG. 13 shows a small gain shift typically observed in the measurement. Five percent decrease in the gain was observed at an exposure rate of 2 kHz/mm$^2$. Again the plate was irradiated by an X-ray generator (Cu target). FIG. 13 shows a result of the gas gain decrease for high intensity X-rays. The gas gain slightly decreased and finally became 70% of the original value (not shown in FIG. 13). This dependency might also be multi-parametric. To optimize the performance of this type of detector, we have to investigate and change the variety of the electrodes. However, if we obtain the whole gain using only one small gap, the corresponding electric field intensity becomes too high which induces the streamer generation from the cathode. The multi-grid approach may improve the situation and one can relieve the load on each gap by using several gaps and additional electrodes.

In accordance with the present invention, a new multi-grid type MSGC has been designed and fabricated. The maximum gas gain was found to be about 18000 for a 10 $\mu$m gap MS plate. Observed amplitude of the cathode signal was almost same as the anode signal. The detector may be applied to the field where both the high gain and the stable operation are required.

What is claimed is:

1. A microstrip gas chamber comprising:
   a gas volume;
   an electrically insulating substrate having a surface which is exposed to said gas volume;
   at least one cathode strip electrode and at least one anode strip electrode on said surface of the substrate;
   a high voltage source for establishing a potential difference between the anode and cathode strip electrodes to thereby produce an electric field sufficient for avalanche multiplication in said gas volume in a region adjacent the anode strip electrode; and
   at least one grid provided on said surface at a gap between the anode strip electrode and the cathode strip electrode for eliminating accumulation of positive ions on the surface and preventing occurrence of discharge between the anode and cathode strip electrodes, thereby preventing breakage of the electrodes.

2. The microstrip gas chamber of claim 1, wherein said grid comprises a strip extending along the anode and cathode strip electrodes.

3. The microstrip gas chamber of claim 2, wherein a plurality of strip grids are provided at the gap between the anode strip electrode and the cathode strip electrode.

4. The microstrip gas chamber of claim 3, wherein a width of each strip grid increases one after another from a grid nearest to the anode strip electrode to a grid nearest to the cathode strip electrode.

5. The microstrip gas chamber of claim 3, wherein individual voltages are applied to the strip grids, respectively.

6. The microstrip gas chamber of claim 3, wherein each of said strip grids is biased by respective independent high voltage sources.

7. The microstrip gas chamber of claim 1, wherein predetermined voltages are applied to each of the anode strip electrode and the cathode strip electrode, and wherein a predetermined voltage is applied to the grid to produce electric fields between the grid and the anode strip electrode, and the grid and the cathode strip electrode.

8. The microstrip gas chamber of claim 7, wherein the predetermined voltage is different than the predetermined voltages applied to the anode and cathode strip electrodes.

9. The microstrip gas chamber of claim 8, wherein the predetermined voltage applied to the grid is higher than the predetermined voltage applied to the cathode strip electrode, and is lower than the predetermined voltage applied to the anode strip electrode.

10. The microstrip gas chamber of claim 7, wherein a plurality of high voltage sources are provided.

11. The microstrip gas chamber of claim 1, wherein the grid is provided adjacent the anode strip electrode, and an exposed surface area is presented between the grid and the cathode strip electrode.

12. The microstrip gas chamber of claim 1, wherein a plurality of grid elements are spacedly arranged with respect to each other along the anode and cathode strip electrodes.

13. The microstrip gas chamber of claim 1, wherein the cathode is kept at the ground potential.

14. An apparatus adapted for use with a microstrip gas chamber, the apparatus comprising:

an electrically insulating substrate having a surface which is exposed to a gas volume of the microstrip gas chamber;

at least one cathode strip electrode and at least one anode strip electrode on said surface of said substrate; and at least one strip grid provided on said surface at a gap between the anode strip electrode and the cathode strip electrode for eliminating accumulation of positive ions on the surface and preventing occurrence of discharge between the anode and cathode strip electrodes, thereby preventing breakage of the electrodes.

15. The apparatus of claim 14, wherein said strip grid comprises a strip extending parallel to the anode and cathode strip electrodes.

16. The apparatus of claim 15, wherein a plurality of strip grids are provided at the gap between the anode and cathode strip electrodes.

17. A method of eliminating discharge between an anode strip and a corresponding cathode strip of MSGC, said MSGC comprising a surface having at least one cathode strip electrode and at least one anode strip electrode thereon, and a high voltage source for establishing a potential difference between the anode and cathode strip electrodes to thereby produce an electric field sufficient for avalanche multiplication in said gas volume in a region adjacent the anode strip electrode, said method comprising:

providing at least one strip grid on said surface at a gap between the anode and cathode strip electrodes; and applying a predetermined voltage to said strip grid to shield a lateral electric field between the anode and cathode strip electrodes adjacent said surface so as to prevent occurrence of discharge between the anode and cathode strip electrodes, thereby preventing breakage of the electrodes.

18. A microstrip gas chamber comprising:

a gas volume;

an electrically insulating substrate, a surface of which is exposed to the gas volume;

at least one cathode strip electrode and at least one anode strip electrode on the surface of the substrate;

a high voltage source for establishing a potential difference between the anode and cathode strip electrodes to thereby produce an electric field sufficient for avalanche multiplication in said gas volume in a region adjacent to the anode strip electrode; and at least one grid electrode provided on the surface at a gap between the cathode strip electrode and the anode strip electrode, wherein said grid electrode is biased in order to eliminate a lateral field adjacent the surface of the substrate between the anode and cathode strip electrodes, thereby preventing occurrence of discharge between the anode and cathode strip electrodes.

19. The microstrip gas chamber of claim 18, wherein a plurality of strip grids are provided at the gap between the anode strip electrode and the cathode strip electrode.

* * * * *